United States Patent [19]

Hill

[11] 4,282,954
[45] Aug. 11, 1981

[54] REWINDER DEVICE

[76] Inventor: John O. Hill, 545 N. James St., Hazelton, Pa. 18201

[21] Appl. No.: 120,704

[22] Filed: Feb. 11, 1980

[51] Int. Cl.³ .............................................. H02G 11/02
[52] U.S. Cl. ................................... 191/12.4; 242/96; 339/5 RL; 339/119 C; 339/147 C
[58] Field of Search .......................... 191/12.2 R, 12.4; 339/5 RL, 119 C, 147 C; 242/96

[56] References Cited

U.S. PATENT DOCUMENTS

| | | |
|---|---|---|
| 1,456,704 | 5/1923 | Medved . |
| 2,483,696 | 10/1949 | Giera . |
| 2,805,290 | 9/1957 | Wentsel . |
| 3,134,556 | 5/1964 | Wasson . |
| 3,369,084 | 2/1968 | Cook .................................. 191/12.4 |
| 3,698,656 | 10/1972 | Ballenger . |
| 3,870,133 | 3/1975 | Brennenstuhl .................. 191/12.4 X |
| 3,952,965 | 4/1976 | Falcon . |
| 3,983,977 | 10/1976 | Crabb . |
| 4,143,746 | 3/1979 | Lowery . |

FOREIGN PATENT DOCUMENTS 923868  4/1973  Canada .
2558901 7/1977 Fed. Rep. of Germany .
1042856  9/1966  United Kingdom .

OTHER PUBLICATIONS

"Bench Boy", Fleck Manufacturing Co., Tillsonburg, Ontario, Can., Brochure No. LR 149-177.
"Sidewinder I", Temoc Inc., Texas, Brochure copyright 1978.

Primary Examiner—Richard A. Schacher
Attorney, Agent, or Firm—Hill, Van Santen, Steadman, Chiara & Simpson

[57] ABSTRACT

A hand reel for use in winding electrical extension cord utilizes a central casing having a grip handle portion extending outward from an uper end thereof. Cord is wound within the casing on a spool means. The spool means is comprised of hub portions mounted at opposed sides of the casing and rotatable relative to the casing. The hubs join together within the casing along mating spool surfaces integrally formed on the hubs. Cap elements are provided along the exterior surfaces of the hubs at opposed ends of the spool. Each cap element contains an electrical receptacle connected with an interior end of the extension cord. Bar handles are formed adjacent to circumferential edges of both hubs, affording ambidextrous rotation of the spool means.

16 Claims, 5 Drawing Figures

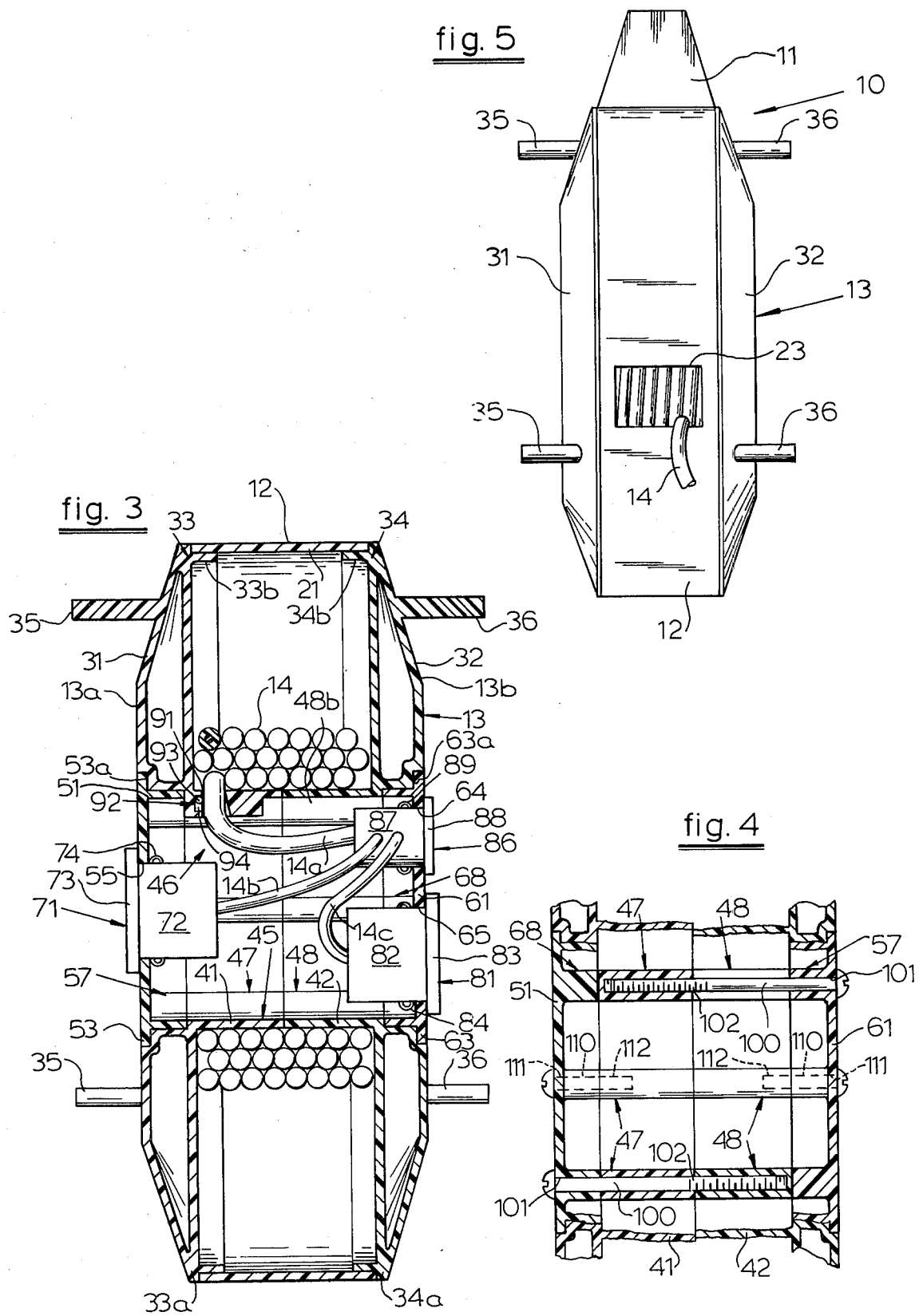

REWINDER DEVICE

BACKGROUND OF THE INVENTION

1. Field of the Invention

The present invention relates generally to reels or rewinders for winding line and, more particularly, to a hand reel for winding electrical extension cord.

2. Description of the Prior Art

There are frequent occasions, especially in construction or repair work, where it is necessary to use an electric tool, such as a portable drill, saw, or the like, an appreciable distance from an outlet source of electric power. An extended electric cord coiled on a reel is typically used to connect the distant point of work with the electric outlet. There have been many attempts to provide a satisfactory hand reel for electrical extension cord. The reel should be lightweight and inexpensive, but rugid enough in design to withstand rough treatment.

A standard cord reel employs a spool-like body disposed between a pair of annular plates or hubs. The spool rotates on an axle. The interior end of an extension cord wound about the spool is connected with an electrical outlet receptacle formed at one end of the spool and rotatable with the reel. U.S. Pat. No. 2,805,290 issued to R. J. Wentsel discloses a reel having a hollow spool with an endplate at one end having a handle for holding the reel and an electrical receptacle in an endplate at the other end of the spool. Another handle is mounted from the hub at the same other end of the spool for rotating the reel about the axis of the stationary handle. U.S. Pat. No. 3,983,977 issued to V. R. Crabb describes a reel having an elongate bar handle extending through a hollow spool and extending outward from one side of the spool for holding the reel. Mounted on the hub at the other end of the spool from the outward extension of the stationary handle is a handle to rotate the reel about the bar handle axis and an electrical receptacle having plural appliance recesses.

The use of a stationary handle coaxial with the spool requires an operator to balance the weight of the reel at a distance from its center of gravity in an awkward fashion. This arrangement is especially difficult to manage when heavy cord or long lengths of cord are to be wound upon the reel. The extended protrument of the stationary handle does not make for compact storage of the reel. Fabrication of such reels may be difficult and relatively expensive due to the many non-symmetrical reel pieces.

SUMMARY OF THE INVENTION

The present invention concerns a cord reel apparatus which overcomes the aforementioned problems, while at the same time provides a rigid assembly which is also lightweight and inexpensive. The reel is comprised of a central annular casing defining a hollow circular center and having a grip handle portion extending outward from the casing at about the upper end thereof. Cord is wound within the casing on a spool means comprised of two hub members. The hubs are mounted across opposed open ends of the casing center and relatively rotatable with the casing. Mating spool portions, integrally formed on the hubs, extend laterally inward within the casing to form a spool or spindle about which electric extension cord is wound. Cap elements are mounted along the exteriors of the hubs at opposed ends of the spool. Each cap element contains an electrical receptacle connected with an interior end of the electric cord. In electric current flow series between each receptacle and the interior cord end, there is a safety overload switch. Knob handles extend outwardly from each of the hubs in order to provide for ambidextrous winding.

BRIEF DESCRIPTION OF THE DRAWINGS

FIG. 3 is a cross-sectional view taken along lines III—III of FIG. 2.

FIG. 4 is a cross-sectional view taken along lines IV—IV of FIG. 2.

FIG. 5 is a front elevational view of the reel of FIG. 1.

DESCRIPTION OF THE PREFERRED EMBODIMENT

Figure 1:
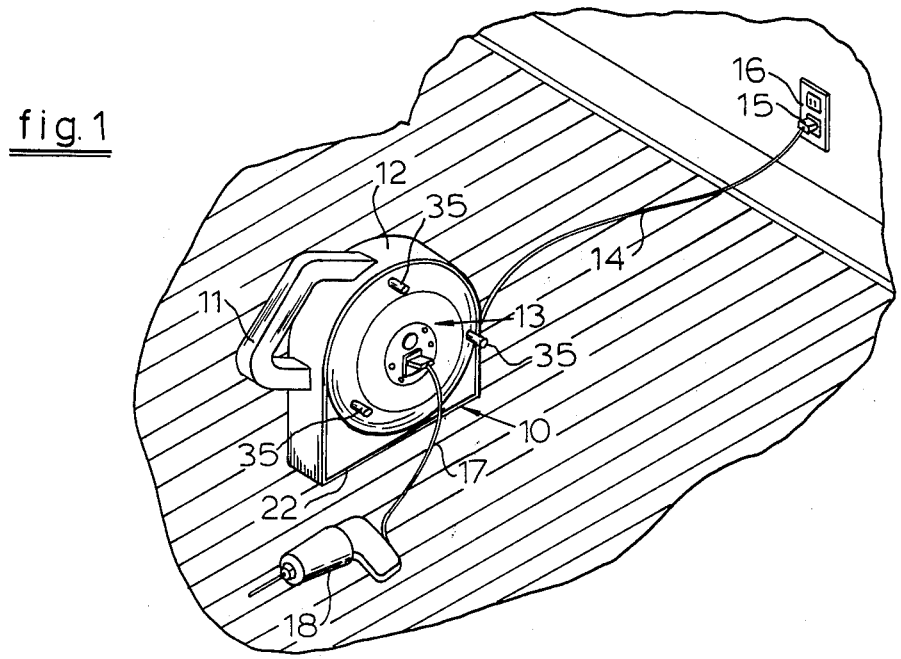
FIG. 1 is a general perspective view of a reel according to the present invention in use with an electric tool.
Figure 2:
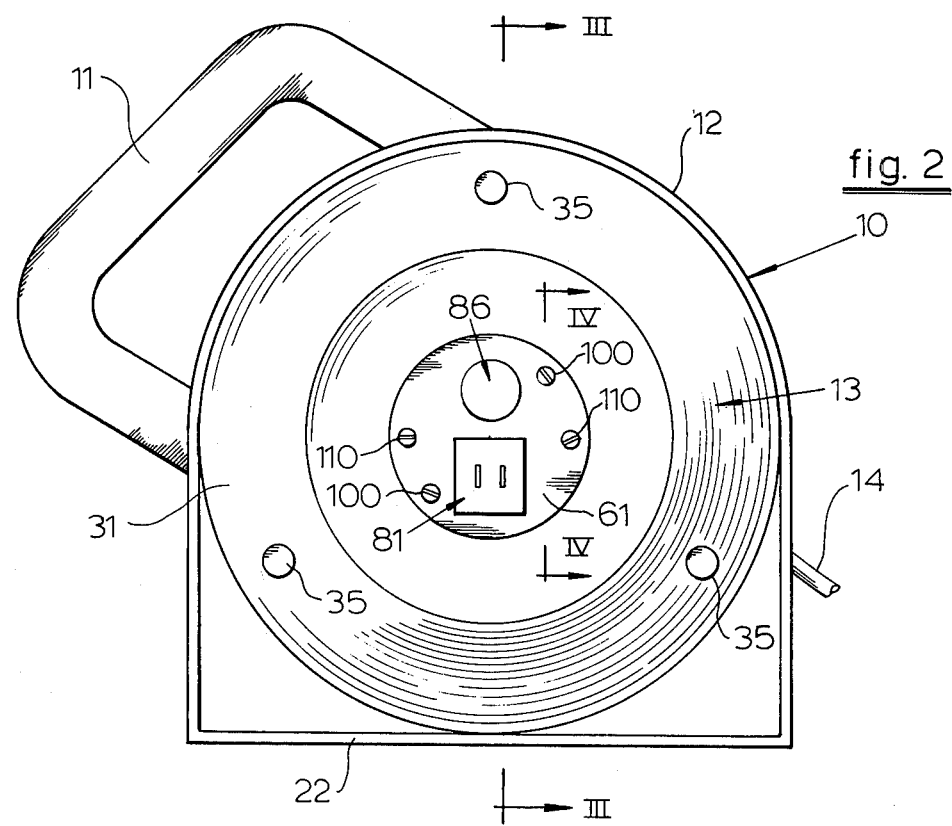
FIG. 2 is a side elevational view of the reel of FIG. 1.

Referring to FIG. 1, there is shown a reel 10 in accordance with the present invention. The reel 10 is portable and preferably formed of plastic molded material so as to be lightweight and inexpensive. A grip handle 11 extends outward from a central annular casing 12 to provide a user with a comfortable, balanced position from which to carry or hold the reel. Mounted for rotation within the annular casing is a spool means 13 for winding an electrical extension cord 14, which is preferably 16 gauge grounded wire. The outer end of the extension cord is fitted with an electric plug 15 which may be connected to a power source receptacle, such as a wall socket outlet 16. At least one electrical receptacle is mounted on one side of the reel in connection with the inner end of the extension cord 14. By plugging an electric device, as hand drill 18 as shown in FIG. 1, into the reel receptacle, the device can be operated an appreciable distance greater than the length of its own cord 17 from the power source outlet 16.

Referring to FIGS. 2–5, the annular casing 12 is generally cylindrical with a hollowed-out circular center 21. The casing is formed with a lower surface 22 which is generally flat so that the reel 10 may be stably positioned on a horizontal surface. Cord passes into and out of the reel 10 through an opening 23 formed in the front surface of casing 12 as illustrated in FIG. 5. The spool means 13 is fitted within the center portion 21. The spool means 13 is comprised of two substantially symmetrical opposed members 13a and 13b which serve to enclose the hollow casing center and define therein a spool about which cord can be wound.

The spool members 13a and 13b are each formed with circular hub or flange portions, 31 and 32 respectively, which fit as endplates across the opposed open ends of the casing center 21. The hubs abut the casing 12 at radially outward surfaces, 33 and 34 respectively, facing inwardly and serving as bearing surfaces by which the hubs may be rotated within the casing 12. The bearing surface portions 33 and 34 are L-shaped when viewed in cross-section. Each bearing surface is comprised of a circular radial surface, 33a and 34a respectively, having a radially extending side in surface to surface parallel mating engagement with the casing wall exterior defining the hollow center 21, and a circular axial surface, 33b and 34b respectively, having a radially outermost side in surface to surface parallel mating engagement along the outer edge portions of the interior sidewall defining casing center 21.

Both hub portions have knob-like handles 35 and 36 extending outward from the outer surfaces of the hubs at positions radially spaced from their center axes. Preferably, three equidistantly arranged knob handles are provided about each hub. By providing the knob handles 35 and 36 on both sides of the spool means 13, the reel 10 is made ambidextrous. A right-handed user can hold the casing 12 stationary with his left hand on grip 11 while he rotates the spool means 13 with his right hand to wind in the extension cord. A left-handed user is able to operate the reel vice-versa.

Extending axially inward from each hub and integrally formed thereon is a spool portion, 41 and 42 respectively. Each spool portion is located coaxial with its hub 31 and 32 respectively, and formed with a circular outer surface of a diameter much less than that of its hub or casing center 21. The spool portions 41 and 42 are each generally in the form of cylinders having a generally cylindrical hollow interior open at both axial ends. When the spool means 13 is assembled within the casing 12, the axially innermost surfaces of the spool portions 41 and 42 align against each other to define a spool or spindle surface 45. A central generally cylindrical hollow space 46 is formed by the mating spool portions having opposed open ends situated centrally within the opposed hubs. A series of mating ridge formations 47 and 48 extend radially inward within the spool portions 41 and 42, respectively. These ridges serve to house screw thread passages or braces for assembly of the reel 10 as described hereinbelow.

A circular cap element 51 is mounted over an open outer end of space 46 which is centrally located on hub member 31. The cap 51 is formed with a circular lip flange 53 which is received in mating relationship with a central circular recess 53a located along the outer surface of the hub 31. A centrally disposed orifice 55 extends through cap 51 for purposes described hereinbelow. A series of ridge formations 57 extend radially inward along the inner face of the cap 51. These ridges serve as further extensions of the thread passages or braces 47 in spool portion 41 and are space for mating alignment with spool ridge formations 47.

At the other side of the reel 10, a second similar circular cap element 61 is mounted over an open outer end of space 46 centrally located on hub member 32. Like flange 53, a circular lip flange 63 is received in mating relationship with a central recess 63a centrally located along the outer surface of the hub 32. For purposes of the preferred embodiment, a pair of vertically aligned orifices 64 and 65 extend through cap 61, rather than a single orifice like 55 with regard to cap 51, for purposes described hereinbelow. A second series of ridge formations 68 extend radially inward along the inner face of the cap 61 in mating alignment with spool ridges 48 to serve as further extensions of the thread passages or braces.

An electrical receptacle 71 is mounted in orifice 55. The receptacle includes a body portion 72 having an outer face 72 extending outward from the body. The receptacle 71 may be held in orifice 55 by means of spring clips or clamps 74 which extend radially outward about the receptacle body 72. The spring means press against the inner surface of cap 51 to bias the outer face 72 substantially flush with the outer surface of the cap 51. Preferably, the springs 74 are constructed such that they depress radially inward for insertion of the body 72 through orifice 55 but preclude withdrawal of the receptacle 71 back through the cap orifice once the clips have passed through the opening.

With regard to cap 61, a second similar electrical receptacle 81, having a body 82 and an outer face 83 portions, is mounted in orifice 65. In similar fashion with springs 74, spring means 84 are mounted about the body 82 to hold the receptacle 81 in place in the cap opening 65. An overload switch means 86, which may be in the form of an electric fuse, circuit breaker, or thermal safety switch, is fitted in cap orifice 64. The overload switch is connected in series with the electrical receptacles 71 and 81 and serves to disconnect the voltage supply to the receptacles by interrupting the current path in the event, for example, of an electric overload. The overload switch thereby protects the reel assembly from heat damage arising for overheating in the cord. The overload switch 86 includes a body portion 87 having a raised outer face surface 88. Spring clip means 89 are provided in the manner of spring means 74 and 84 and are situated about the overload body housing 87 to retain the switch in orifice 64.

The electric cord 14 is connected with the electrical receptacles 71 and 81 as follows to energize them when plugged in. As illustrated in FIG. 3, an aperture or passage 91 extends radially through the spool surface 45 in one spool portion 41. An inner end 14a of the cord 14 is threaded through the aperture 91 to extend into the hollow space 46. The cord end 14a is connected in space 46 with the overload switch 86, which has been provided as a safety precaution to prevent, for example, overheating of electrical devices plugged into the reel 10. Cord pieces 14b and 14c extend from the overload switch into electrical connection with the receptacles 71 and 81, respectively, such that the receptacles may be energized by current passing through the extension cord 14. In this manner, more than one electrical device can be plugged into the reel 10 simultaneously and operated. The preferred 16 gauge extension cord carries enough current for simultaneous operation of at least two electric hand tools when plugged into a household electrical outlet.

A cord clamp means 92 may be provided to prevent the inner end of the cord from being withdrawn from reel space 46 when the cord has been fully unwound from the reel. The clamp means comprises a plastic ball member 93 fitted in an interference fit against the cord, but able to ride freely in a vertical slot 94 which faces open into the passage 91. The passage 91 is of increasing width in the radially inward direction. When the cord is threaded through aperture 91 into space 46, the ball 93 is then pushed toward the lower end of slot 94 where the passage is sufficiently wide to accommodate the ball and cord in loose fashion. Slight movement of the cord out of space 46 through passage 91 draws the ball 93 upward in its slot to a point in the passage 91 where there is not sufficient width to accommodate further upward movement of the cord and ball.

In order to assemble the spool means 13 onto the reel casing 12 for relative rotation therewith, screws 100 are driven through passage openings 101 on the cap elements 51 and 61 and into the brace passages 102 contained in ridge formations 57, 47, 48, and 68 formed along the cap and spool portion members. As illustrated in FIG. 4, for purposes of the preferred embodiment, one set of brace passages 102 for assembly of the spool may have openings facing out onto the outer surface of cap 51; while another set of spool assembly passages has openings facing out from cap 61. Screw passages 102 extend, at least, from the passage cap surface opening 101 into the ridge formed on the furthest spool portion therefrom.

In order to assemble the cap elements 51 and 61 onto the hub members 31 and 32, respectively, opposed screws 110 are driven through passage openings 111 formed on the cap elements and into brace passages 112 contained within opposed ends of these ridge formations formed along the cap and spool portion members. Screw passages 112 extend, at least, from the cap openings 111 into the ridge formed on the nearest spool portion thereto.

Although various minor modifications may be suggested by those versed in the art, it should be understood that I wish to embody within the scope of the patent warranted hereon all such modifications as reasonably and properly come within the scope of my contribution to the art.

I claim as my invention:

1. A hand reel for electrical extension cord comprising:
    a central, enclosed casing defining a hollow circular center,
    a spool means for holding electrical extension cord comprised of circular hubs, said hubs having bearing surfaces fitted for rotation in opposed exterior ends of said casing center, and spool portions, said spool portions being integrally formed on said hubs and extending interiorly of said casing and said spool portions having mating inner surfaces for joining together within said casing,
    means for mounting electrical receptacles on said hubs at opposed ends of said spool,
    means for connecting said electrical receptacles with electrical extension cord contained in said spool means,
    a first handle means formed on said central cylindrical casing, and
    second handle means extending outward from each of said hub portions for rotating said spool means.

2. The reel according to claim 1, further comprising: at least one electrical extension cord wound about said mating spool portions.

3. The reel according to claim 2, wherein said connection means includes a central hollow space formed by said mating spool portions and in communication with terminal means for said electrical receptacles and at least one aperture in one of said spool portions through which an interior end of said at least one cord is threaded into said hollow space.

4. The hand reel according to claim 3, wherein said connection means further includes a clamp means for retaining said interior end of said cord threaded into said hollow space.

5. The reel according to claim 2, wherein said mounting means for said electrical receptacles comprises cap elements fitted in each said hub portion.

6. The reel according to claim 2, wherein said connection means includes at least one safety overload switch in series connection between an interior end of said at least one cord and said electrical receptacles.

7. The reel according to claim 1, wherein said casing and said spool means are made of plastic molded material.

8. The reel according to claim 1, wherein said inner mating spool portion surfaces contain screw thread passages.

9. The reel according to claim 1, wherein said casing is formed with a generally flat lower surface.

10. A hand reel assembly made of plastic material for containing electrical extension cord comprising:
    a central enclosed casing defining a hollow circular center,
    first and second spool members, each comprising a respective annular sidewall hub portion and a respective annular spool portion integral with and extending axially of said corresponding sidewall hub portion and of reduced diameter relative thereto,
    said first and second spool portions extending interiorly of said casing center such that free ends thereof join together in contiguous relation,
    said first and second sidewall hub portions fitted in opposed exterior ends of said casing center and having outer edge bearing surfaces for rotational engagement with corresponding edge surfaces on said casing,
    connection means for connecting together said first and second spool portion free ends in said casing, and
    means for mounting electrical receptacles on said first and second sidewall hub portions at opposed exterior ends of said casing center.

11. The reel assembly of claim 10, further comprising handle means extending outward from each of said first and second sidewall hub portions.

12. The reel assembly of claim 10, further comprising a generally radial passage through one of said first and second spool portions and a one-way gate means adjacent said radial passage for preventing extension cord extending radially inwardly through said radial passage from being pulled radially outwardly therefrom.

13. The reel assembly of claim 12, wherein said gate means comprises a ball member freely movable in a generally radial slot of increasing width in the radially inward direction.

14. The reel assembly of claim 10, wherein said connection means comprises screw passages extending through one spool portion and partially into the other spool portion.

15. The reel assembly of claim 10, wherein said means for mounting electrical receptacles comprises cap elements respectively fitted in said sidewall hub portions.

16. The reel assembly of claim 10, further comprising circuit-breaker means mounted adjacent one of said first and second spool portions, said circuit breaker means adapted for in series electrical connection between said electrical receptacles and an interior end of extension cord.

* * * * *